United States Patent
Ren et al.

(10) Patent No.: US 9,548,690 B2
(45) Date of Patent: Jan. 17, 2017

(54) SYSTEM AND METHOD FOR ADJUSTING CURRENT REGULATOR GAINS APPLIED WITHIN A POWER GENERATION SYSTEM

(71) Applicant: General Electric Company, Schenectady, NY (US)

(72) Inventors: Wei Ren, Niskayuna, NY (US); Einar Vaughn Larsen, Charlton, NY (US); Sidney Allen Barker, Troutville, VA (US)

(73) Assignee: General Electric Company, Schenectady, NY (US)

( * ) Notice: Subject to any disclaimer, the term of this patent is extended or adjusted under 35 U.S.C. 154(b) by 264 days.

(21) Appl. No.: 14/193,812

(22) Filed: Feb. 28, 2014

(65) Prior Publication Data
US 2015/0249413 A1 Sep. 3, 2015

(51) Int. Cl.
*F03D 9/00* (2016.01)
*H02P 9/04* (2006.01)
*H02P 9/00* (2006.01)
*F03D 7/00* (2006.01)
*H02J 3/38* (2006.01)
*H02P 9/10* (2006.01)
(Continued)

(52) U.S. Cl.
CPC ............ *H02P 9/007* (2013.01); *F03D 7/00* (2013.01); *F03D 7/0284* (2013.01); *F03D 9/003* (2013.01); *H02J 3/386* (2013.01); *H02P 9/102* (2013.01); *H02P 9/107* (2013.01); *H02P 2101/15* (2015.01); *Y02E 10/723* (2013.01); *Y02E 10/725* (2013.01); *Y02E 10/763* (2013.01)

(58) Field of Classification Search
CPC ........... H02P 9/007; H02P 9/102; H02P 9/107; F03D 7/00; F03D 7/0284; F03D 9/003
USPC ................................................. 290/44, 55
See application file for complete search history.

(56) References Cited

U.S. PATENT DOCUMENTS 7,629,705 B2   12/2009   Barker et al.
7,928,780 B1    4/2011   Yuan et al.
(Continued)

FOREIGN PATENT DOCUMENTS

EP    2317134 A2    5/2011

OTHER PUBLICATIONS

Kar et al., "A Novel PI Gain Scheduler for a Vector Controlled Doubly-Fed Wind Driven Induction Generator", Electrical Machines and Systems, IEEE, vol. 2, pp. 948-953, Sep. 27, 2005.
(Continued)

*Primary Examiner* — Tulsidas C Patel
*Assistant Examiner* — Thomas Quigley
(74) *Attorney, Agent, or Firm* — Dority & Manning, P.A.

(57) ABSTRACT

In one aspect, a method for controlling the operation of a power generation system configured to supply power to an electrical grid may generally include monitoring a rotor speed of a generator of the power generation system and determining a gain scaling factor based on the rotor speed, wherein the gain scaling factor increases with decreases in the rotor speed across a range of rotor speeds. In addition, the method may include adjusting a regulator gain to be applied within a current regulator of the power generation system based on the gain scaling factor and applying the adjusted regulator gain within the current regulator in order to generate a voltage command signal for controlling a power converter of the power generation system.

20 Claims, 5 Drawing Sheets

(51) Int. Cl.
*F03D 7/02* (2006.01)
*H02P 101/15* (2015.01)

(56) References Cited

U.S. PATENT DOCUMENTS

| | | |
|---|---|---|
| 8,014,181 B2 | 9/2011 | Tan et al. |
| 8,046,109 B2 | 10/2011 | Larsen et al. |
| 2003/0147186 A1* | 8/2003 | Schultz .................. H02P 9/305 361/15 |
| 2011/0075456 A1* | 3/2011 | Tan ........................ H02M 7/48 363/74 |
| 2012/0010759 A1* | 1/2012 | Larsen .................. F03D 7/0284 700/292 |
| 2012/0229063 A1 | 9/2012 | Yokokawa et al. |
| 2012/0310426 A1* | 12/2012 | Tarnowski ............ F03D 7/0272 700/287 |
| 2014/0203560 A1* | 7/2014 | Gerber .................. F03D 7/0224 290/44 |

OTHER PUBLICATIONS

A PCT Search Report and Written Opinion issued in connection with corresponding PCT Application No. PCT/US2015/016781 on May 4, 2015.

\* cited by examiner

SYSTEM AND METHOD FOR ADJUSTING CURRENT REGULATOR GAINS APPLIED WITHIN A POWER GENERATION SYSTEM

FIELD OF THE INVENTION

The present subject matter relates generally to power generation systems and, more particularly, to a system and method for adjusting current regulator gains applied within a power generation system based on a monitored rotor speed of a generator of the system.

BACKGROUND OF THE INVENTION

Power generation systems often include a power converter that is configured to convert an input power into a suitable power for application to a load, such as a generator, motor, electrical grid, or other suitable load. For instance, a power generation system, such as a wind turbine system, may include a power converter for converting variable frequency alternating current power generated at the generator into alternating current power at a grid frequency (e.g. 50Hz or 60 Hz) for application to a utility grid. An exemplary power generation system may generate AC power using a wind-driven doubly fed induction generator (DFIG). A power converter can regulate the flow of electrical power between the DFIG and the grid.

In many instances, power generation systems may be located in remote areas far from the loads they serve. This is particularly true for renewable energy sources, such as wind turbine systems, solar/photovoltaic systems, hydroelectric systems and/or the like. Typically, such power generation systems are connected to the electrical grid through an electrical system including long transmission lines connected to the grid using one or more breakers. Often such transmission lines include one or more series compensation elements (e.g., one or more capacitors) to facilitate reducing reactive power losses within the transmission lines, thereby increasing the power transfer capacity of the lines.

Unfortunately, when a power generation system is coupled to a series compensated transmission line, the system may experience sub-synchronous instability and may often trip unintentionally. This is a particularly true for wind-driven DFIG systems due to the DFIG exhibiting negative equivalent resistance in the frequency range below its nominal frequency. In such instance, the electrical system control components typically do not provide sufficient damping at such low frequency ranges, thereby resulting in system instability.

Accordingly, a system and method for controlling aspects of the operation of a power generation system that allow for enhanced system stability would be welcomed in the technology. In particular, a system and method for controlling aspects of the operation of a power generation system that allow for enhanced sub-synchronous stability when the system is connected to a series compensated transmission line would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for controlling the operation of a power generation system configured to supply power to an electrical grid. The method may generally include monitoring a rotor speed of a generator of the power generation system and determining a gain scaling factor based on the rotor speed. In addition, the method may include adjusting a regulator gain to be applied within a current regulator of the power generation system based on the gain scaling factor and applying the adjusted regulator gain within the current regulator in order to generate a voltage command signal for controlling a power converter of the power generation system.

In another aspect, the present subject matter is directed to a power generation system including a generator, a power converter coupled to the generator; and a computing device configured to control the operation of the power converter. The computing device may store instructions that, when implemented by one or more processors, configure the computing device to monitor a rotor speed of a generator of the power generation system and determine a gain scaling factor based on the rotor speed. In addition, the computing device may be configured to adjust a regulator gain to be applied within a current regulator of the power generation system based on the gain scaling factor and apply the adjusted regulator gain within the current regulator in order to generate a voltage command signal for controlling a power converter of the power generation system.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

In general, the present subject matter is directed to a system and method for controlling the operation of a power generation system. Specifically, in several embodiments, the disclosed system and method provide a means for adjusting the regulator gain(s) applied within a current regulator(s) of the power generation system based on the rotor speed of the generator. For example, as will be described below, a gain scaling factor may be calculated based on the generator rotor speed that may be used to modify the regulator gains for the real and/or reactive current regulators. Such modified regulator gains may provide for enhanced control of the power converter of the system (particularly at reduced rotor speeds), thereby providing improved system stability.

In a particular embodiment of the present subject matter, the disclosed system and method may be advantageously applied within wind-driven DFIG systems connected to series compensated transmission lines. Specifically, as indicated above, such systems may exhibit sub-synchronous instability that can result in undesirable system operation. This typically results when the power converter control cannot provide sufficient damping within the frequency range associated with operation at sub-synchronous speeds. However, by modifying the regulator gain(s) applied within the current regulators as the rotor speed decreases below the generator's synchronous speed, the equivalent damping provided by the converter control may be increased significantly, thereby providing for improved system stability.

It should be appreciated that, although the present subject matter will generally be described herein with respect to a wind turbine system, the disclosed system and method may generally be utilized within any suitable power generation system in order to facilitate regulator gain adjustments based on the generator rotor speed in a manner that provides for improved system stability.

Figure 1:
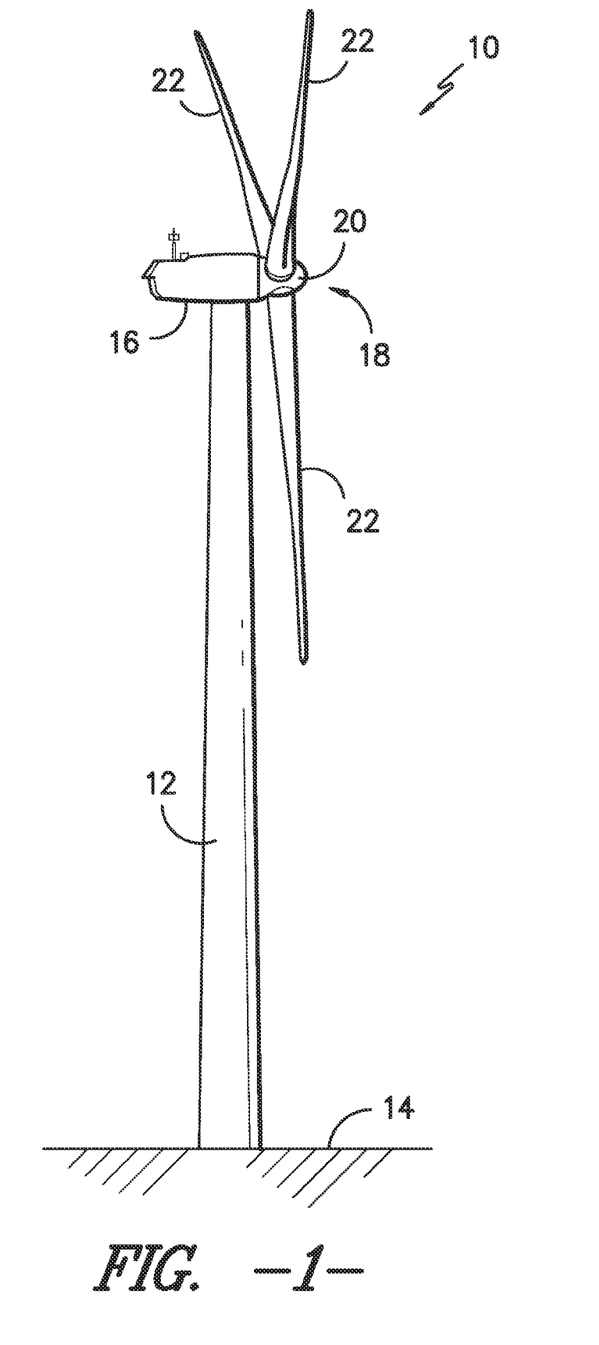
FIG. 1 illustrates a perspective view of one embodiment of a wind turbine.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, as will be described below, the rotor 18 may be rotatably coupled to an electric generator 120 (FIG. 2) to permit electrical energy to be produced.

Figure 2:
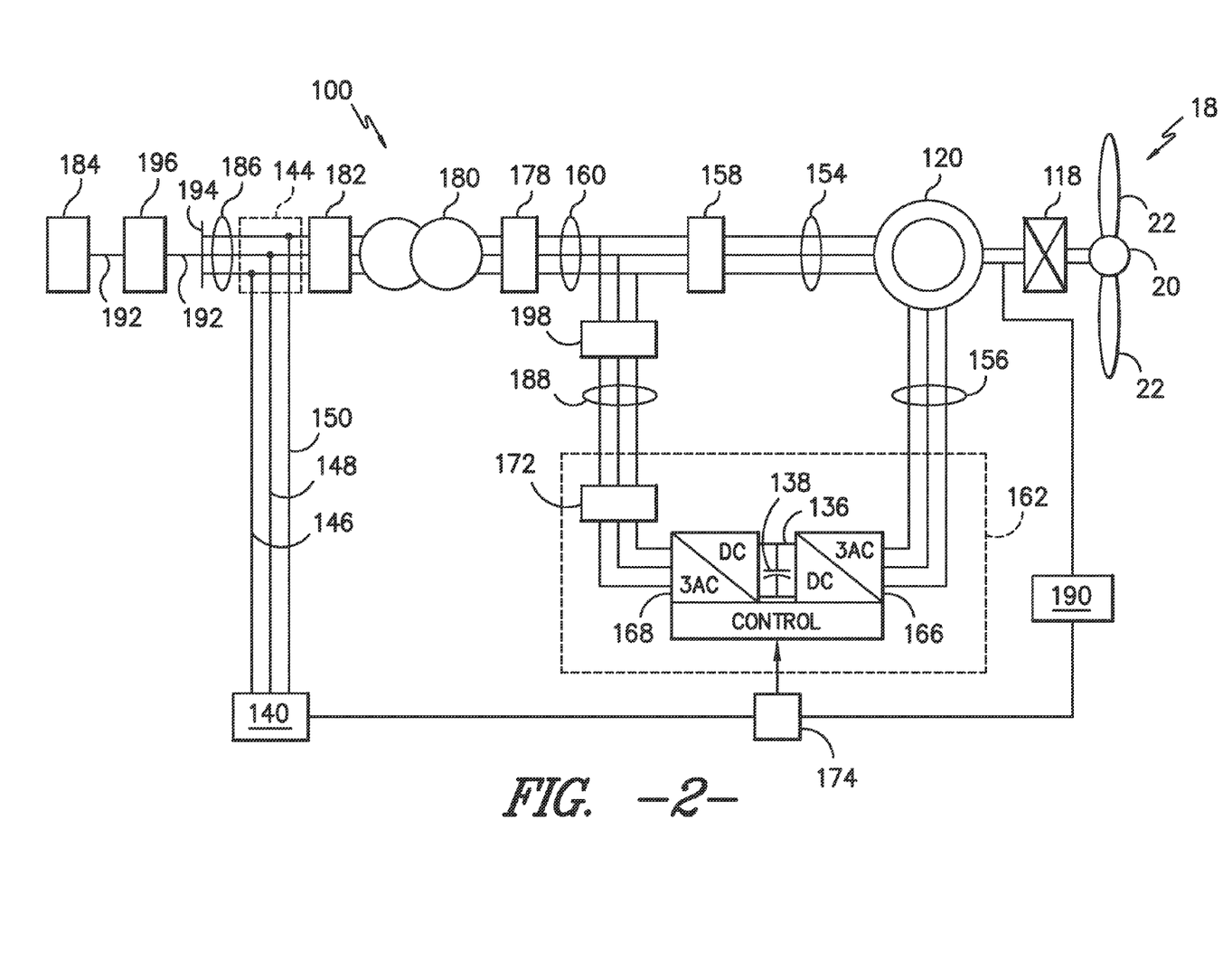
FIG. 2 illustrates a schematic diagram of one embodiment of a wind turbine system in accordance with aspects of the present subject matter.

Referring now to FIG. 2, a schematic diagram of one embodiment of a wind turbine system 100 is illustrated in accordance with aspects of the present subject matter. As shown, the rotor 18 of the wind turbine 10 may, optionally, be coupled to a gear box 118, which is, in turn, coupled to a generator 120. In several embodiments, the generator 120 may be a doubly fed induction generator (DFIG). However, in other embodiments, the generator 120 may correspond to any other suitable type of generator.

The generator 120 may be coupled to a stator bus 154 and a power converter 162 via a rotor bus 156. The stator bus 154 may provide an output multiphase power (e.g. three-phase power) from a stator of the generator 120 and the rotor bus 156 may provide an output multiphase power (e.g. three-phase power) from a rotor of the generator 120. As shown in FIG. 2, the power converter 162 includes a rotor side converter 166 and a line side converter 168. The generator 120 may be coupled via the rotor bus 156 to the rotor side converter 166. Additionally, the rotor side converter 166 may be coupled to the line side converter 168 which may, in turn, be coupled to a line side bus 188.

In several embodiments, the rotor side converter 166 and the line side converter 168 may be configured for normal operating mode in a three-phase, pulse width modulation (PWM) arrangement using suitable switching elements, such as insulated gate bipolar transistors (IGBTs) or any other suitable switching elements. The rotor side converter 166 and the line side converter 168 may be coupled via a DC link 136 across which one or more DC link capacitors 138 may be arranged in any parallel and/or series combination.

In addition, the power converter 162 may be coupled to a controller 174 configured to control the operation of the rotor side converter 166 and the line side converter 168. In general, the controller 174 may correspond to any suitable computing device and/or combination of computing devices. For instance, in several embodiments, the controller 174 may include one or more processor(s) and associated memory device(s configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 174 to perform various functions including, but not limited to, the computer-implemented methods described herein.

In typical configurations, various line contactors and circuit breakers including, for example, a grid breaker 182 may also be included for isolating the various components as necessary for normal operation of the generator 120 during connection to and disconnection from the electrical grid 184. For example, a system circuit breaker 178 may couple the system bus 160 to a transformer 180, which may be coupled to a grid bus 186 via the grid breaker 182. In alternative embodiments, fuses may replace some or all of the circuit breakers.

Additionally, as shown in FIG. 2, one or more transmission lines 192 (only one shown for clarity) may be coupled to the grid bus 186 via grid coupling 194. In several embodiments, the transmission line(s) 192 may include one or more series compensation elements 196, such as one or more capacitors, to facilitate reducing the reactive power losses within the transmission line(s) 192. As indicated above, such series compensated transmission line(s) 192 may often result in sub-synchronous instability of the wind turbine system 100. However, in other embodiments, the transmission line(s) 192 need not correspond to series compensation transmission lines.

In operation, alternating current power generated at the generator 120 by rotating the rotor 18 is provided via a dual path to the electrical grid 184. The dual paths are defined by the stator bus 154 and the rotor bus 156. On the rotor side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC link 136. As is generally understood, switching elements (e.g. IGBTs) used in the bridge circuits of the rotor side power converter 166 may be modulated to convert the AC power provided from the rotor bus 156 into DC power suitable for the DC link 136.

In addition, the line side converter 168 converts the DC power on the DC link 136 into AC output power suitable for the electrical grid 184. In particular, switching elements (e.g. IGBTs) used in bridge circuits of the line side power converter 168 can be modulated to convert the DC power on the DC link 136 into AC power on the line side bus 188. The AC power from the power converter 162 can be combined with the power from the stator of generator 120 to provide multi-phase power (e.g. three-phase power) having a frequency maintained substantially at the frequency of the electrical grid 184 (e.g. 50 Hz or 60 Hz). In addition, the power flow from the rotor 18 through the converters 166, 168 and to the grid 184 may be in other direction.

Additionally, various circuit breakers and switches, such as grid breaker 182, system breaker 178, stator sync switch 158, converter breaker 198, and line contactor 172 may be included in the system 100 to connect or disconnect corresponding buses, for example, when current flow is excessive and may damage components of the wind turbine system 100 or for other operational considerations. Additional protection components may also be included in the wind turbine system 100.

Moreover, the power converter 162 may receive control signals from, for instance, the controller 174. The control signals may be based, among other things, on sensed conditions or operating characteristics of the wind turbine system 100. Typically, the control signals provide for control of the operation of the power converter 162. For instance, as shown in FIG. 2, one or more speed sensors 190 may be communicatively coupled to the controller 174 for monitoring the rotor speed of the generator 120. Such rotor speed feedback may, for example, be used to control the conversion of the output power from the rotor bus 156 to maintain a proper and balanced multi-phase (e.g. three-phase) power supply. In particular, the sensed rotor speed may be used as a basis for adjusting the switching frequency of the switching elements. Additionally, as will be described below, the rotor speed feedback may also be used as a basis for adjusting the regulator gain(s) applied within one or more of the current regulators of the system 100. Moreover, feedback from other sensors may also be used by the controller 174 to control the power converter 162, including, for example, stator, rotor and/or grid bus voltages, voltages associated with the switching elements and current feedbacks. Using the various forms of feedback information, switching control signals (e.g. gating control commands for the switching elements), stator synchronizing control signals, circuit breaker signals and/or other suitable control commands/signals may be generated.

Additionally, in several embodiments, the controller 174 may also be configured to receive feedback from a phase-locked loop (PLL) regulator 140. As is generally understood, the PLL regulator 140 may include or correspond to a closed looped circuit configured to detect phase information regarding a reference voltage (e.g., the grid voltage) and generate a resulting phase angle signal 142 to be used by the controller 174 for controlling the operation of the power converter 172 in a manner that synchronizes the converter's output voltage to the reference voltage. Specifically, the phase angle signal 142 generated by the PLL regulator may be constantly adjusted to match, in phase, the frequency of the reference grid voltage, thereby allowing the PLL regulator to "lock on" to the frequency of grid bus 186. It should be appreciated that, although the PLL regulator 140 is illustrated herein as being separate from the controller 174, the PLL regulator 140 may be integrated into and/or form part of the controller 174. Alternatively, the PLL regulator 140 may be implemented on a separate computing device that is communicatively coupled to the controller 174.

In several embodiments, the PLL regulator 140 may be coupled to one or more voltage transducers 144 for receiving reference voltage measurements. For instance, as shown in FIG. 2, the PLL regulator 140 is coupled to three different voltage transducers 144 (e.g., via electrical conduits 146, 148, 150), with each voltage transducer 144 being coupled to one of the three phases of the grid bus 186. Alternatively, the PLL regulator 140 may be coupled to one or more voltage transducers configured to measure the voltage at any other suitable location within the system 100.

Figure 3:
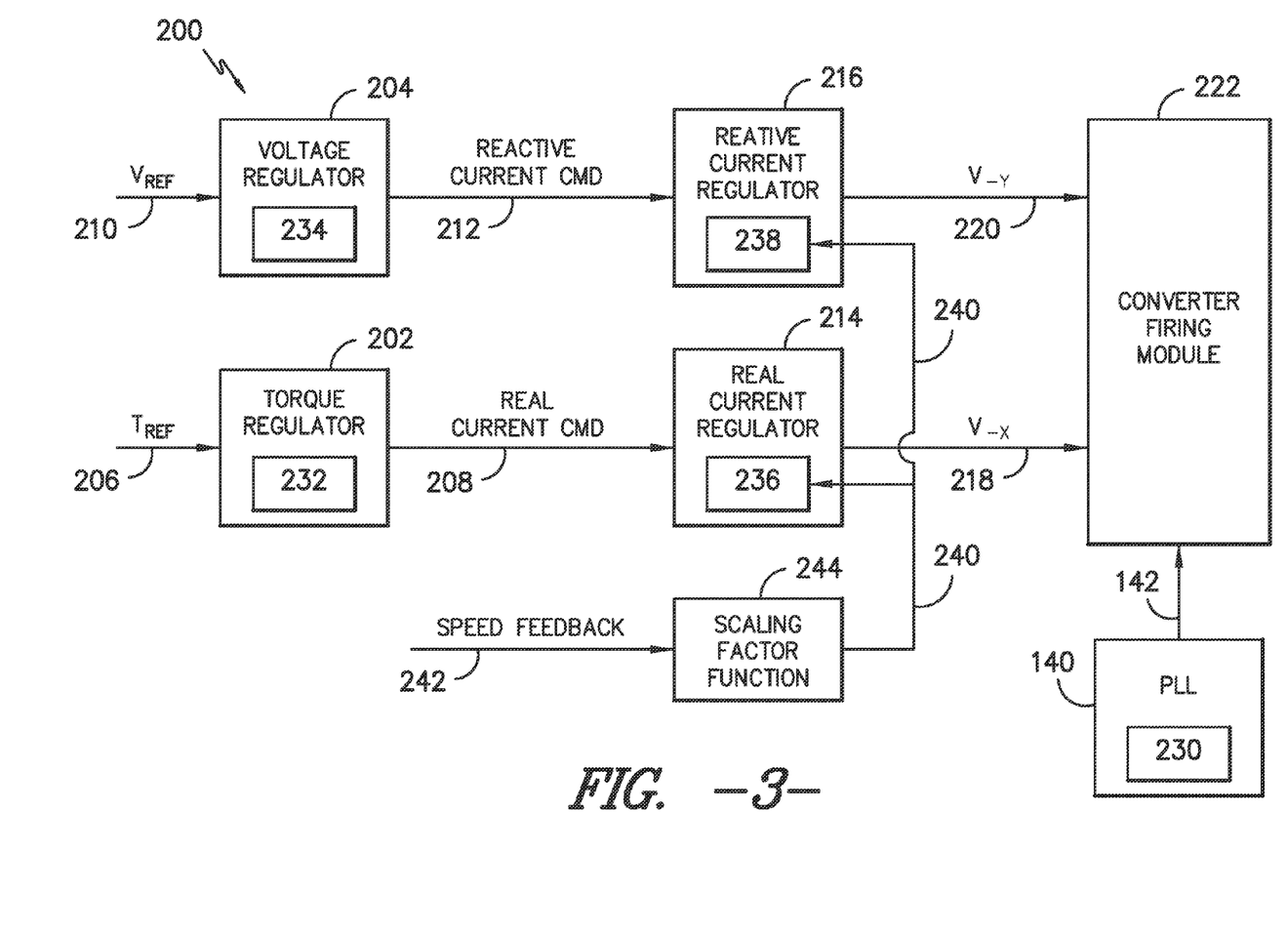
FIG. 3 illustrates a schematic diagram of one embodiment of a system for controlling a power generation system in accordance with aspects of the present subject matter.

Referring now to FIG. 3, a schematic view of one embodiment of a system 200 for controlling the operation of a power generation system is illustrated in accordance with aspects of the present subject matter. In several embodiments, the various system components shown in FIG. 3 may be implemented within the controller 174 described above, such as by being implemented via computer-readable instructions stored within and executable by the controller 174. Alternatively, one or more of the system components may be implemented using a separate computing device that is communicatively coupled to the controller 174.

As shown, the system 200 may include both a torque regulator 202 and a voltage regulator 204. The torque regulator 202 may generally be configured to receive a reference torque signal 206 (e.g., a reference value stored within the controller 174) and generate a real current command 208 based on the reference torque signal 206. Additionally, the voltage regulator 204 may be configured to receive a reference voltage signal 210 (e.g., based on the voltage measurement signals provided by the voltage transducers 144 described above) and generate a reactive current command 212 based on the reference voltage signal 210.

Additionally, the system 200 may include both a real current regulator 214 and a reactive current regulator 216. The real current regulator 214 may generally be configured to receive the real current command 208 transmitted from the torque regulator 202 and generate a first voltage command 218 based on such current command 208. Similarly, the reactive current regulator 216 may generally be configured to receive the reactive current command 212 transmitted from the voltage regulator 204 and generate a second voltage command 220 based on such current command 212. In several embodiments, the first and second voltage commands 218, 220 may correspond to x and y components of the commanded system voltage, respectively. In such embodiments, the x-y coordinate system may, for example, be rotated or oriented such that the second voltage command 220 (e.g., V_y) is equal to zero and the first voltage command 218 (e.g., V_x) is equal to the magnitude of the system voltage when the PLL regulator 140 is synchronized with the grid voltage. However, in other embodiments, the coordinate system may be rotated or oriented in any other suitable manner.

As is generally understood, the first and second voltage commands 218, 220, together with the phase angle signal 142 generated by the PLL regulator 142, may be transmitted to a converter firing module 222 (e.g., implemented via computer-readable instructions included within the controller 174 and/or any other suitable computing device) configured to control the operation of the power converter 162. For example, in one embodiment, the converter firing module 222 may be configured to transmit suitable gating signals to one or more gate drivers for controlling the activation of the switching elements contained within the power converter 162. As such, based on the voltage commands 218, 220 and the phase angle signal 142, the converter firing module 222 may be configured to control the operation of the power converter 162 in a manner consistent with the disclosure provided herein.

As shown in FIG. 3, each of the various system regulators 140, 202, 204, 214, 216 may include a proportional-integral (PI) filter 230, 232, 234, 236, 238 providing a closed-loop feedback mechanism to facilitate minimizing the steady state error in the command signals generated by the regulators. In such an embodiment, the PI filter 230, 232, 234, 236, 238 for each regulator may be configured to utilize both proportional gain constants and integral gain constants (e.g., stored in suitable registers (not shown)) to compensate for differences in the commands signals generated by the respective regulators relative to suitable feedback signals input into each filter. For example, the PI filters 236, 238 associated with the current regulators 214, 216 may be configured to compensate for any differences defined between the voltage commands 218, 220 and suitable voltage feedback signals received by the current regulators 214, 216.

Additionally, in accordance with aspects of the present subject matter, the disclosed system 200 may be configured to modify the gain(s) applied within one or both of the current regulators 214, 216 based on the rotor speed of the generator 120. Specifically, in several embodiments, a gain scaling factor 240 may be calculated based on the rotor speed that allows for the gain(s) applied within the PI filters 236, 238 to be modified with reductions in the rotor speed. Such modified gains may allow for improved control of the power converter 162 at the lower rotor speeds and, thus, may result in enhanced system stability, particularly when the power generation system is connected to the electrical grid via a series compensated transmission line. For example, as indicated above, a DFIG wind turbine system (e.g., system 100) connected to an electrical grid via a series compensated transmission line may often experience sub-synchronous instability, which may result in the generator tripping unintentionally due to the negative equivalent resistance exhibited in the frequency ranges below the nominal frequency. However, by modifying the gains applied within the PI filters(s) 236, 238 associated with one or both of the current regulators 214, 216 in response to reductions in the rotor speed, the increase in equivalent damping provided by the converter control may account for the reduction in damping provided by the generator 120 at such reduced speeds, thereby maintaining system stability.

As shown in FIG. 3, to allow for the adjustment in the regulator gain(s), a rotor speed feedback signal 242 (e.g., provided via the speed sensor(s) 190) may be input into a scaling factor function 244. In general, the scaling factor function 244 may correspond to any suitable transfer function or mathematical relationship that generates a gain scaling factor 240 based on the rotor speed feedback signal 242. For example, as will be described below with reference to FIG. 5, the scaling factor function 244 may correspond to a mathematical relationship relating the generator rotor speed to a given scaling factor 240 such that the scaling factor 240 increases with decreases in the rotor speed. However, in other embodiments, depending on the configuration of the control system 200 and/or the various electrical system components associated therewith, the scaling factor function 244 may be selected such that the scaling factor 240 decreases with reductions in the rotor speed.

It should be appreciated that the rotor speed feedback signal 242 may generally correspond to any suitable feedback signal associated with the monitored rotor speed of the generator 120. For example, in several embodiments, the rotor speed feedback signal 242 may correspond to an average of the rotor speed measurements provided by the speed sensor(s) 190 over a given time period (e.g., an average of the speed measurements taken over 10 to 50 milliseconds). Alternatively, the rotor speed feedback signal 242 may correspond to rotor speed measurements passed through a suitable filter, such as a low pass filter or any other suitable filter.

As shown, the gain scaling factor 240 generated by the scaling factor function 244 may then be applied within the PI filter 236, 238 associated with one or both of the current regulators 214, 216. For example, in several embodiments, the gain scaling factor 240 may be applied as a multiplier for the proportional and/or integral gains utilized within the real current regulator 214 in order to adjust the gain(s) used to generate the first voltage command 218. In addition (or as an alternative thereto), the gain scaling factor 240 may be applied as a multiplier for the proportional and/or integral gains utilized within the reactive current regulator 216 in order to adjust the gain(s) used to generate the second voltage command 220. The voltage command(s) 218, 220 generated using the modified gain(s) may then be transmitted to the converter firing module 222 and subsequently used to control the operation of the power converter 162.

It should be appreciated that, although the example control system 300 shown in FIG. 3 illustrates the same gain scaling factor 240 being applied within the PI filters 236, 238 for both the real and reactive current regulators 214, 216, the scaling factor 240 used to modify the regulator gain(s) may, in alternative embodiments, differ between such regulators 214, 216. Additionally, in one embodiment, the gain scaling factor 240 may differ depending on whether it is being utilized to modify the proportional gain value or the integral gain value applied within one or both of the PI filters 236, 238.

Figure 4:
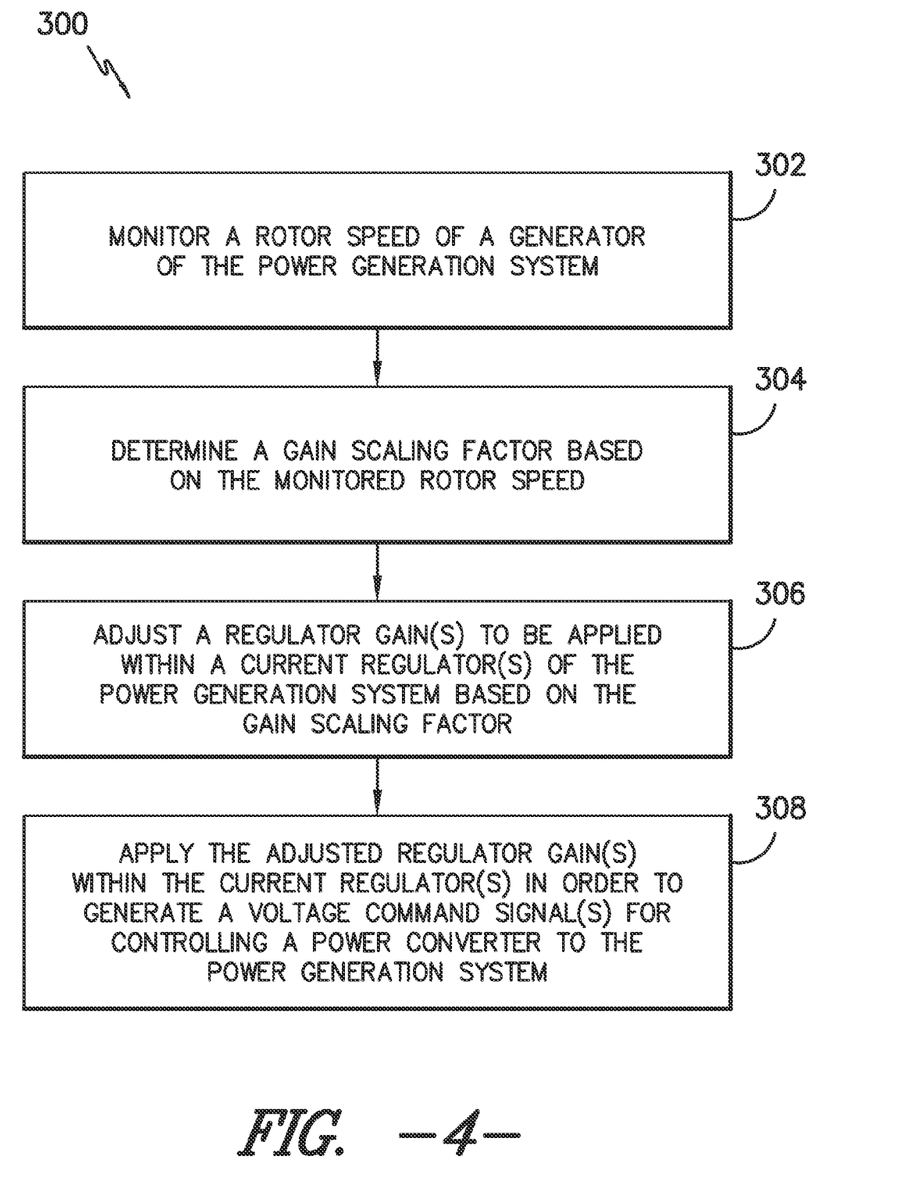
FIG. 4 illustrates a flow diagram of one embodiment of a method for controlling a power generation system in accordance with aspects of the present subject matter.

Referring now to FIG. 4, one embodiment of a method 300 for controlling a power generation system is illustrated in accordance with aspects of the present subject matter. In general, the method 300 will be described herein as being implemented using a wind turbine system, such as the wind turbine system 100 described above with reference to FIGS. 2-4. However, it should be appreciated that the disclosed method 300 may be implemented using any other suitable power generation system that is configured to supply power for application to a load. In addition, although FIG. 4 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown in FIG. 4, at (302), the method 300 includes monitoring a rotor speed of a generator of the power generation system. Specifically, as indicated above, one or more speed sensors 190 may be configured to monitor the rotor speed of the generator 120. Such rotor speed measurements may then be transmitted to and/or stored within the controller 174 for subsequent processing and/or analysis.

Additionally, at (304), the method 300 includes determining a gain scaling factor based on the monitored rotor speed. As indicated above, a rotor speed feedback signal 242 associated with the monitored rotor speed may be input into a scaling factor function 244 for generating a gain scaling factor 240. In such embodiments, a suitable mathematical function may be developed that correlates the feedback signal 242 to a given scaling factor 240. Specifically, in several embodiments, the mathematical relationship may be selected such that the gain scaling factor 240 increases with decreases in the rotor speed.

Figure 5:
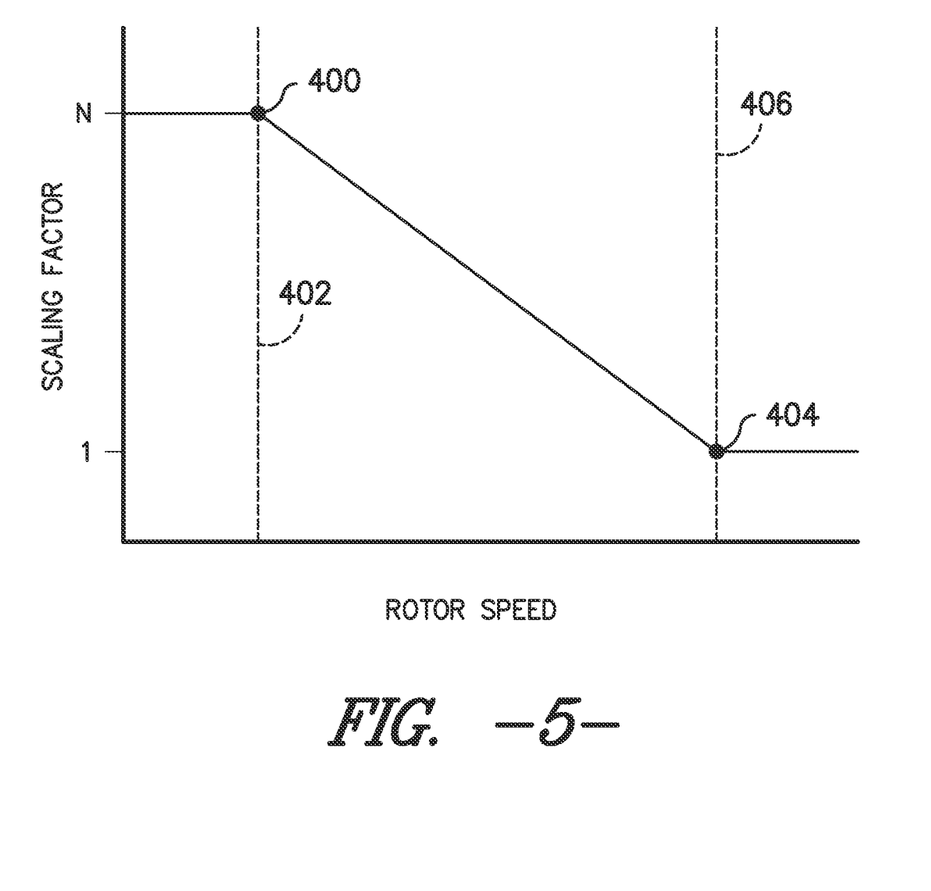
FIG. 5 illustrates a graphical representation of one example of a suitable function for correlating rotor speeds to a gain scaling factor in accordance with aspects of the present subject matter.

For instance, FIG. 5 illustrates a graphic representation of one example of a suitable mathematical function that may be utilized as the scaling factor function 244 for determining the corresponding gain scaling factor 240 in accordance with aspects of the present subject matter. In particular, the graph charts the generator rotor speed along the x-axis and the gain scaling factor 240 along the y-axis. As shown, the mathematical function provides for a linear relationship between the rotor speed and the gain scaling factor 240 such that the scaling factor 240 decreases linearly from a maximum value (N) at point 400 when the generator rotor speed is equal to a first rotor speed (indicated by line 402) to a value of one at point 404 when the generator rotor speed is equal to a second, high rotor speed (indicated by line 406). Thus, as the rotor speed is decreased from the second rotor speed 406 towards the first rotor speed 402, the gain scaling factor 240 may be increased from one towards the maximum value (N). Additionally, as shown in FIG. 5, in certain embodiments, the gain scaling factor 240 may be maintained at a value of one for rotor speeds exceeding the second rotor speed 406 and/or maintained at the maximum value (N) for rotor speeds lower than the first rotor speed 402.

It should be appreciated that the first and second rotor speeds 402, 406 may generally correspond to any suitable pre-defined rotor speeds. For example, in a particular embodiment, the first rotor speed 402 may correspond to a minimum operating speed for the generator 120 (e.g., around 800 RPM for some wind turbine generators) and the second rotor speed 406 may correspond to the synchronous speed for the generator 120 (e.g., around 1200 RPM for some wind turbine generators). In such an embodiment, the gain scaling factor 240 may be increased from a value of one towards the maximum value (N) as the rotor speed drops below the synchronous speed and the generator 120 begins to operate at sub-synchronous speeds. However, in other embodiments, the first and second rotor speeds 402, 406 may correspond to any other suitable pre-defined rotor speeds, such as by defining the second rotor speed 406 as the maximum operating speed of the generator 120.

Additionally, in several embodiments, the maximum value (N) for the gain scaling factor 240 may generally correspond to any suitable value that provides for the desired adjustment to the regulator gains based on the current rotor speed. For example, in a particular embodiment, the maximum value (N) may range from about 1.5 to about 10, such as from about 2.0 to about 5.0 or from about 3.0 to about 4.0 and any other subranges therebetween.

It should also be appreciated that, in alternative embodiments, any other suitable mathematical relationship may be utilized to calculate the gain scaling factor 240 as a function of the generator rotor speed. For instance, as opposed to the linear relationship shown in FIG. 5 between points 400, 404, a non-linear relationship, such as a second, third or higher order polynomial, may be provided for calculating the gain scaling factor 240 associated with rotor speeds defined between the first and second rotor speeds 402, 406. Additionally, it should be appreciated that, in further alternative embodiments, the scaling factor function 244 need not be selected such that the gain scaling factor 240 continuously increases from the second rotor speed 406 to the first rotor speed 402. For instance, it may be desirable to have a region within the range of generator rotor speeds defined between the first and second rotor speeds 402, 406 along which the gain scaling factor 240 is maintained constant.

Moreover, in alternative embodiments, the scaling factor function 244 may be selected such that the gain scaling factor 240 decreases with reductions in the rotor speed. For example, depending on the configuration of the control system and/or the associated electrical system components, decreased regulator gains may provide for improved system stability at lower generator rotor speeds. In such instances, the scaling factor 244 may be reduced as the rotor speed decreases to provide for such reduced regulator gains.

Referring back to FIG. 4, at (306), the method 300 includes adjusting a regulator gain(s) to be applied within a current regulator(s) of the power generation system based on the gain scaling factor. Specifically, as indicated above, the gain scaling factor 240 may be utilized as a multiplier for the proportional and/or integral gains applied within the PI filter(s) 236, 238 associated with the real current regulator 214 and/or the reactive current regulator 216. As such, with reductions in the rotor speed (e.g., below the second rotor speed 406 (FIG. 5)), the gain scaling factor 240 may be used to modify the regulator gain(s) applied within one or both of the current regulators 214, 216, thereby allowing for the corresponding voltage command(s) 218, 220 generated by the current regulator(s) 214, 216 to be adjusted in a manner that allows for improved control of the power converter 162 at such reduced rotor speeds.

For example, as indicated above with reference to FIG. 5, the gain scaling factor 240 may, in one embodiment, be increased from a value of one at the synchronous speed of the generator 120 to a maximum value (N) at the minimum operating speed of the generator 120. In such embodiments, for operation at sub-synchronous speeds, the regulator gain(s) applied within one or both of the current regulators 214, 216 may be increased in a manner that allows for increased damping to be provided via the converter control, thereby improving the overall stability of the power generation system. Additionally, as indicated above, such increased regulator gains may be particularly advantageous in improving the sub-synchronous stability for power generation systems connected to series compensated transmission lines.

Moreover, as shown in FIG. 4, at (308), the method 300 includes applying the adjusted regulator gain(s) within the current regulator(s) in order to generate a voltage command signal(s) for controlling a power converter of the power generation system. For example, as indicated above, the adjusted regulator gain(s) may be applied within the PI filter(s) 236, 238 for the real and/or reactive current regulators 214, 216 to allow such regulator(s) 214, 216 to generate a corresponding voltage command(s) 218, 220. The voltage command(s) 218, 220 may then be transmitted to the converter firing module 222 and subsequently used to control the operation of the power converter 162.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling the operation of a power generation system configured to supply power to an electrical grid, the method comprising:
   monitoring a rotor speed of a generator of the power generation system;
   determining a gain scaling factor based on the rotor speed, the gain scaling factor being associated with a scaling factor function selected such that the gain scaling factor decreases from a predetermined maximum value at a first rotor speed to a predetermined minimum value at a second rotor speed as the rotor speed increases from the first rotor speed to the second rotor speed and is maintained at the predetermined minimum value for rotor speeds exceeding the second rotor speed, the second rotor speed corresponding to a synchronous speed for the generator;
   adjusting a regulator gain to be applied within a current regulator of the power generation system based on the gain scaling factor; and
   applying the adjusted regulator gain within the current regulator in order to generate a voltage command signal for controlling a power converter of the power generation system.

2. The method of claim 1, wherein the predetermined minimum value corresponds to a value of one.

3. The method of claim 1, wherein the first rotor speed corresponds to a minimum operating speed for the generator.

4. The method of claim 1, wherein adjusting the regulator gain comprises multiplying the regulator gain by the gain scaling factor such that the regulator gain is increased for rotor speeds less than the second rotor speed.

5. The method of claim 1, wherein the current regulator corresponds to a real current regulator of the power generation system.

6. The method of claim 1, wherein the current regulator corresponds to a reactive current regulator of the power generation system.

7. The method of claim 1, further comprising controlling the power converter based on the voltage command signal.

8. The method of claim 1, wherein the power generation system is connected to a series compensated transmission line.

9. A power generation system, the system comprising:
a generator;
a power converter coupled to the generator; and
a computing device configured to control the operation of the power converter, the computing device storing instructions that, when implemented by one or more processors, configure the computing device to:
   monitor a rotor speed of a generator of the power generation system;
   determine a gain scaling factor based on the rotor speed, the gain scaling factor being associated with a scaling factor function selected such that the gain scaling factor decreases from a predetermined maximum value at a first rotor speed to a predetermined minimum value at a second rotor speed as the rotor speed increases from the first rotor speed to the second rotor speed and is maintained at the predetermined minimum value for rotor speeds exceeding the second rotor speed;
   adjust a regulator gain to be applied within a current regulator of the power generation system based on the gain scaling factor; and
   apply the adjusted regulator gain within the current regulator in order to generate a voltage command signal for controlling a power converter of the power generation system,
   wherein the second rotor speed corresponds to a synchronous speed for the generator.

10. The system of claim 9, wherein the predetermined minimum value corresponds to a value of one.

11. The system of claim 9, wherein the first rotor speed corresponds to a minimum operating speed for the generator.

12. The system of claim 9, wherein the computing device is configured to multiply the regulator gain by the gain scaling factor such that the regulator gain is increased for rotor speeds less than the second rotor speed.

13. The system of claim 9, wherein the current regulator corresponds to a real current regulator of the power generation system.

14. The system of claim 9, wherein the current regulator corresponds to a reactive current regulator of the power generation system.

15. The system of claim 9, wherein the computing device is further configured to control the power converter based on the voltage command signal.

16. The system of claim 9, wherein the power generation system is connected to a series compensated transmission line.

17. The system of claim 9, wherein the generator comprises a doubly fed induction generator.

18. The system of claim 9, wherein the power generation system comprises a wind turbine system.

19. The system of claim 9, wherein the gain scaling factor function defines a direct relationship between the gain scaling factor and the monitored rotor speed without reference to another rotor speed of the generator.

20. The method of claim 1, wherein the gain scaling factor function defines a direct relationship between the gain scaling factor and the monitored rotor speed without reference to another rotor speed of the generator.

* * * * *